United States Patent [19]
Idogaki et al.

[11] Patent Number: 4,561,629
[45] Date of Patent: Dec. 31, 1985

[54] SOLENOID VALVE

[75] Inventors: Takaharu Idogaki; Ikuo Hayashi, both of Okazaki; Hisasi Kawai, Toyohashi; Kyo Hattori, Susono; Kazuhiro Sakurai, Gotenba, all of Japan

[73] Assignees: Nippon Soken, Inc., Nishio; Toyota Jidosha Kabushiki Kaisha, Toyota, both of Japan

[21] Appl. No.: 593,309

[22] Filed: Mar. 26, 1984

[30] Foreign Application Priority Data

Mar. 28, 1983 [JP]  Japan .................................. 58-52224

[51] Int. Cl.⁴ .............................................. F16K 31/08
[52] U.S. Cl. .................................. 251/65; 251/129.10; 335/230
[58] Field of Search .................. 251/65, 129, 137, 133, 251/141; 335/229, 230

[56] References Cited

U.S. PATENT DOCUMENTS

| | | | |
|---|---|---|---|
| 2,974,923 | 3/1961 | Herman | 251/137 |
| 3,794,868 | 2/1974 | Haigh | 251/65 |
| 4,428,558 | 1/1984 | Odogaki et al. | 251/65 |
| 4,442,997 | 4/1984 | Idogaki et al. | 251/65 X |
| 4,491,815 | 1/1985 | Idogaki et al. | |

FOREIGN PATENT DOCUMENTS

| | | | |
|---|---|---|---|
| 106600 | 6/1927 | Austria | 251/137 |
| 853060 | 10/1970 | Canada | 251/65 |
| 48002 | 2/1980 | Japan | 251/65 |
| 48109 | 9/1981 | Japan | 251/65 |

Primary Examiner—Arnold Rosenthal
Attorney, Agent, or Firm—Cushman, Darby & Cushman

[57] ABSTRACT

A solenoid valve for opening and closing a fluid passage is disclosed. It includes a valve member supported rotatably within a case and having alternately different magnetic poles formed on the outer periphery of one end thereof and also having a fluid passage formed in the other end thereof; an electromagnetic drive means for creating alternately different and invertible magnetic poles in an opposed relation to the magnetic poles of the valve member to rotate the valve member by a predetermined angle; and plural fluid passages formed within the case and adapted to be brought into communication with each other through the fluid passage of the valve member upon rotation of the valve member at said predetermined angle.

10 Claims, 18 Drawing Figures

F I G.1
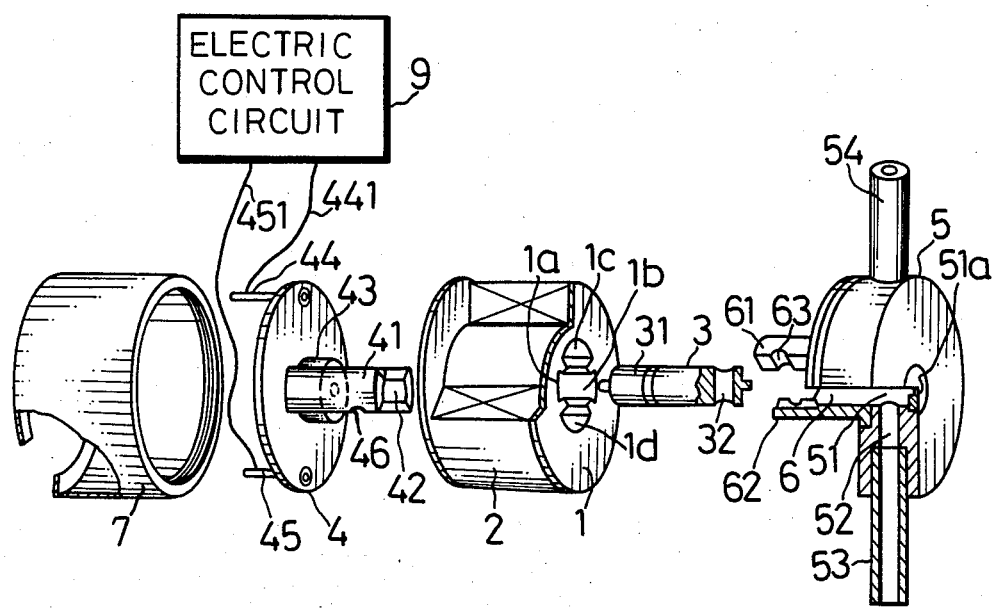
F I G.2
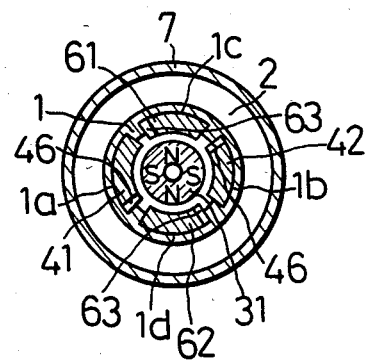

SOLENOID VALVE

BACKGROUND OF THE INVENTION

The present invention relates to a solenoid valve and more particularly to a solenoid valve to be used, for example, for controlling the pressure of a diaphragm chamber in a diaphragm type flow control valve.

In internal combustion engines, diaphragm type flow control valves have been used for adjusting the intake volume or for adjusting the amount of exhaust gas to be recycled in EGR (Exhaust Gas Recirculation). Solenoid valves which have heretofore been used for controlling the pressure of a diaphragm chamber are of a structure in which a valve member adapted to close a fluid flowing port by virtue of a spring force is moved in its opening direction by an electromagnetic force. In this type of pressure control, for example, the diaphragm chamber is connected directly to the atmosphere side and connected also to a negative pressure source such as an intake manifold or the like through a solenoid valve, and its internal pressure is controlled to a predetermined level by opening and closing the solenoid valve at a constant period. The open/close cycle of the solenoid valve usually reaches about 20 Hz and thus the condition of use is fairly severer than in other uses of the valve. Consequently, the solenoid valve of such conventional structure as referred to above involves the problem that its service life is shortened by the fatigure of a spring, the wear of a valve stopper which functions to restrict the range of movement of the valve member, etc.

SUMMARY OF THE INVENTION

Objects of the present invention are to provide a solenoid valve which permits the open/close cycle to be extremely shortened, to provide a solenoid valve of a simple structure, superior in both durability and quick response characteristic and permitting a reduced power consumption, and to provide a solenoid valve which dispenses with a spring and a valve stopper.

The solenoid valve of the present invention includes a case, a rod-like valve member which is supported rotatably within the case and which has altenately different magnetic poles formed at equal intervals on the outer periphery of one end thereof and a fluid passage formed at the other end thereof, an electromagnetic drive means for creating alternately different and invertible magnetic poles in an opposed relation to the magnetic poles of the valve member to rotate the valve member at every predetermined angle, and fluid passages formed within the case and adapted to be communicated with the fluid passage of the valve member according to the angle of rotation of the valve member.

BRIEF DESCRIPTION OF THE DRAWINGS

FIG. 1 is an exploded perspective view showing the structure of a solenoid valve according to an embodiment of the present invention;

FIG. 2 is a transverse sectional view of the solenoid valve of FIG. 1;

FIGS. 3(i) through 6(z) illustrate operations of the solenoid valve of FIG. 1; and FIGS. 7(i) through 10(z) illustrate operation of a solenoid valve according to another embodiment of the present invention.

DESCRIPTION OF THE PREFERRED EMBODIMENT

Figure 3:
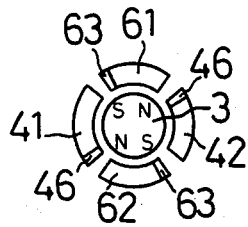
Figure 3:
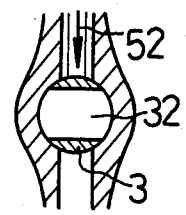

The present invention will be described below more in detail on the basis of the illustrated embodiments thereof.

Referring first to FIGS. 1 and 2, a coil 2 is wound round a cylindrical coil bobbin 1 formed of a nonmagnetic material, whereby there is formed a magnetic flux passing through the interior of the coil bobbin. Into the coil bobbin 1 is inserted one end portion 31 of a rod-like valve member 3. The fore end of the one end portion 31 of the valve member 3 is formed of a permanent magnet, on the outer periphery of which are formed alternately different magnetic poles at 90° intervals as shown in FIG. 2. On the other hand, in the inner peripheral wall of the coil bobbin 1 are formed four axially extending grooves 1a, 1b, 1c and 1d at equal intervals of 90°.

The reference numeral 4 in FIG. 1 denotes a disc-like yoke formed of a ferromagnetic material. The yoke 4 has a bearing portion 43 formed in the center of one disc face thereof, and a pair of projections 41 and 42 project perpendicularly to the disc face in an opposed relation to each other so as to hold the bearing portion 43 radially therebetween. The projections 41 and 42 are respectively inserted into the opposed grooves 1a and 1b of the coil bobbin 1 until the one disc face of the yoke 4 comes into abutment with one end face of the bobbin 1. The tip end of the valve member 3 inserted in the coil bobbin 1 is held rotatably in a central bore of the bearing portion 43 of the yoke 4, and the fore end portion of the projections 41 and 42 are positioned opposingly to the outer periphery of the one end portion 31, i.e., permanent magnet, of the valve member 3. On the other disc face of the yoke 4 are provided terminal pins 44 and 45 for power supply, which are connected through lead wires 441 and 451 to an electric control circuit 9 which serves as an energizing means.

The numeral 5 in FIG. 1 denotes a valve housing which is in a circular form. In the center of the circular housing 5 is formed an axially extending through hole 51, one opening of which is closed with a bearing member 51a, and a cylindrical yoke 6 formed of ferromagnetic material is fitted in the through hole 51. Further, another through hole 52 is formed radially in the housing 5. The yoke 6 is provided at one end thereof with a pair of rod-like projections 61 and 62 projecting to the exterior of the housing 5. The projections 61 and 62 of the yoke 6 are fitted in the other opposed grooves 1c and 1d of the coil bobbin 1 as shown in FIG. 2, whereby one end face of the housing 5 is brought into abutment with the other end face of the bobbin 1. The other end of the valve member 3 inserted in the yoke 6 is rotatably held in a central bore of the bearing 51a of the housing 5. The fore ends of the projections 61 and 62 are positioned in an opposed relation to the outer periphery of the one end portion 31, i.e., permanent magnet, of the valve member 3.

In the other end portion of the valve member 3 is formed a through hole 32 extending therethrough in a radial direction. The through hole 32 has a diameter larger than that of the through hole 52 formed in the housing 5. The other end portion of the valve member 3 passes through the through hole 52 of the housing 5 in a direction orthogonal to the through hole 52, and the position of the through hole 32 of the valve member 3 is coincident with that of the through hole 52 formed in the housing 5. The through holes 32 and 52 communicate with each other at a predetermined angle of rotation of the valve member 3. Further, joint pipes 53 and 54 are attached to the lower and upper openings of the through hole 52 of the housing 5, the pipe 53 being connected to a line leading to an intake manifold (not shown) and the pipe 54 being connected to a line leading to a diaphragm chamber of a flow control valve (not shown).

The projections 41, 42, 61 and 62 of the yokes 4 and 6 have the respective inner peripheral surfaces each formed in the shape of an arc which is parallel to the outer peripheral surface of the circular one end portion 31, i.e., permanent magnet, of the valve member 3 as shown in FIG. 2. On side faces of the projections 41 and 42 and one side faces of the projections 61 and 62 are partially notched to form grooves 46 and 63, respectively. When the projections 41, 42, 61 and 62 are inserted into the coil bobbin 1, the groove 46 and 63 are positioned on one side in the circumferential direction.

The coil bobbin 1 and the yokes 4 and 6 thus integrally assembled are covered with a valve case 7. The valve case 7 and the valve housing 5 are threadably engaged with each other through threaded portions formed at the respective opposed edges.

The operation of the solenoid valve having the above-described construction will be described below with reference to FIGS. 3 through 6.

When the electromagnetic coil 2 (FIG. 2) is not energized, no magnetic pole is created in the projections 41, 42, 61 and 62 of the yokes 4 and 6 as shown in FIG. 3(1). In this state, the grooves 46 and 63 formed in the projections 41, 42, 61 and 62 act as magnetic path resistances against the magnetic poles formed on the side of the valve member 3, thus allowing the valve member 3 to turn so that its magnetic poles are positioned at magnetic stable points between the grooves 46 and 63. At this time, the through hole 32 of the valve member 3 and the through hole 52 of the housing 5 intersect perpendicularly to each other and are thereby cut off from each other, as shown in FIG. 3(2), so that the diaphragm chamber of the flow control valve is intercepted from the intake manifold, thus causing the internal pressure of the diaphragm chamber to be increased from the negative pressure toward the atmospheric pressure.

Figure 4:
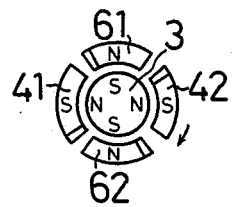
Figure 4:
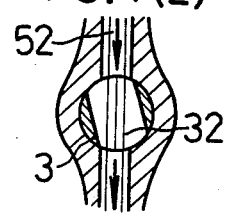

When the electromagnetic coil 2 is energized in the forward direction by the electric control circuit 9, magnetic poles are created in the projections 41, 42, 61 and 62 by virtue of a magnetic flux passing through the coil bobbin 1 (FIG. 1), and the valve member 3 is turned clockwise by approximately 90 degrees as shown in FIG. 4(1) by the magnetic force induced by the magnetic poles of the projections 41, 42, 61 and 62 and of the valve member 3, whereby the through holes 32 and 52 are communicated with each other as shown in FIG. 4(2). so that the diaphragm chamber of the flow control valve is communicated with the intake manifold of a high negative pressure and its internal pressure decreases gradually.

Figure 5:
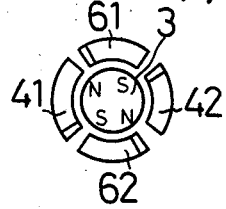
Figure 5:
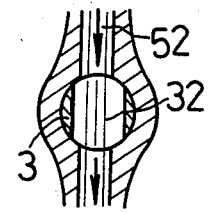

When the electromagnetic coil 2 is de-energized, the valve member 3 turns slightly in a clockwise direction up to the next magnetic stable point as shown in FIGS. 5(1) and 5(2), but the state of communication between the through holes 32 and 52 does not change.

Figure 6:
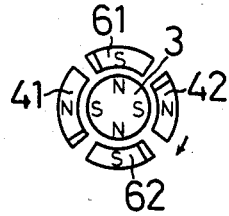
Figure 6:
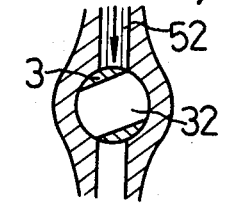

Next, when the electromagnetic coil 2 is energized in the reverse direction by the electric control circuit 9, inverted magnetic poles are created in the projections 41, 42, 61 and 62 as shown in FIG. 6(1) and the valve member 3 is again turned in a clockwise direction by the resultant magnetic force, whereby the through holes 32 and 52 are again cut off as shown in FIG. 6(2), thus allowing the internal pressure of the diaphragm chamber of the flow control valve to be increased again toward the atmospheric pressure.

Thereafter, when the coil 2 is de-energized, the valve 3 turns slightly in a clockwise direction up to the next magnetic stable point and reverts to the state shown in FIG. 3.

Thus, in the solenoid valve of the present invention, the electromagnetic coil 2 is energized alternately in the forward and reverse directions, whereby the valve member 3 is turned to effect opening and closing operation to thereby adjust the internal pressure of the diaphragm chamber of the flow control valve.

Since the valve member 3 is magnetically held in its tuned position it is sufficient to energize the coil 2 pulsewise for several milliseconds when the valve member 3 is to be turned, and by changing the time interval of forward and reverse pulses it is made possible to maintain the internal pressure of the diaphragm chamber at a predetermined level for obtaining a desired flow rate.

Although in the above embodiment the through hole 52 is formed rectilinearly in the valve housing 5, it may be formed in the shape of Y (radially) to obtain a three way valve.

Figure 7:
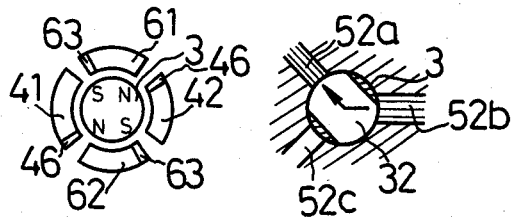
Figure 8:
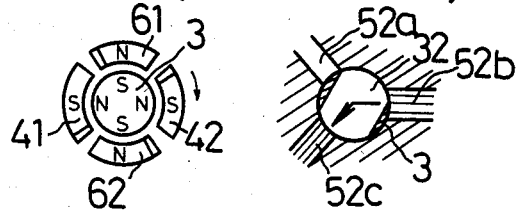
Figure 9:
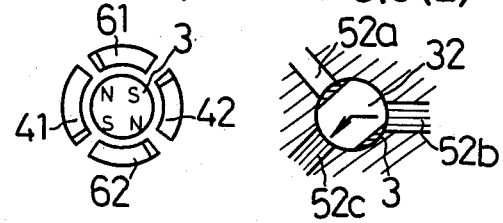
Figure 10:
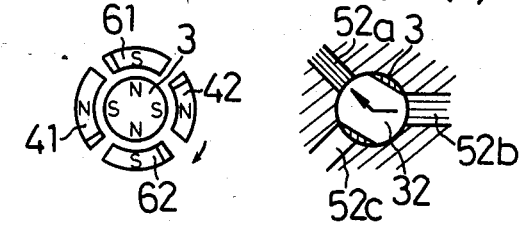

FIGS. 7 through 10 illustrate operations of a solenoid valve according to such another embodiment (three-way valve) of the present invention. When the electromagnetic coil 2 (FIG. 1) is in a de-energized state, through holes 52a and 52b communicate with each other as shown in FIG. 7; when the coil 2 is energized in the forward direction, the through holes 52b and 52c are communicated with each other as shown in FIG. 8; then, when the coil 2 is de-energized, the communication between the through holes 52b and 52c is maintained as shown in FIG. 9; and when the coil 2 is energized in the reverse direction, the through holes 52a and 52b are brought into communication with each other as shown in FIG. 10.

Although in the above embodiments the grooves 46 and 63 are formed in on side faces of the projections 41, 42, 61 and 62 to widen the gap between the side faces of opposed projections in order to enlarge the magnetic path resistance, such grooves may be formed in the faces opposed to the valve member 3 of one end portions of the projections 41, 42, 61 and 62 to widen the gap with respect to the valve member 3. Alternatively, projections may be formed in place of such grooves to reduce the magnetic path resistance.

The number of magnetic poles of the valve member may be two or four, or even more.

According to the solenoid valve of the present invention, as set forth hereinabove, a rod-like valve member is turned by a magnetic force to effect opening and closing operations, thereby dispensing with a spring and a valve stopper which are required in conventional solenoid valves.

Consequently, the solenoid valve of the present invention is extremely simple in sturcture and has a superior durability. In addition, since one end of the valve member is inserted into the coil bobbin, the length of the device in the axial direction of the valve member can be made short. Moreover, since the valve member is turned quickly by a magnetic force to effect opening and closing operations, and since the valve member is turned to the next magnetic stable point by a predetermined angle when the magnetic coil is de-energized there can be attained a quick response characteristic, which permits highly frequent operations to be performed at a short cycle. Further, the power consumption is reduced because the electromagnetic coil may be energized pulsewise for a short time, and unlike conventional solenoid valves using a pulse motor, the valve is opened when the coil is energized in the forward and reverse directions independently of the initial state, so there can be attained a high controllability.

What is claimed is:

1. A solenoid valve for opening and closing a fluid passage, comprising:
   (1) a case;
   (2) a rod-like valve member supported rotatably within said case, said valve member having alternately different magnetic poles formed at equal intervals on the outer periphery of one end thereof and also having a fluid passage formed at the other end thereof;
   (3) an electromagnetic drive means for creating alternately different and invertible magnetic poles in an opposed relation to said magnetic poles of said valve member to rotate said valve member by a predetermined angle;
   said electromagnetic drive means comprising a coil bobbin into which is inserted said one end of said valve member, an electromagnetic coil wound round said coil bobbin for generating a magnetic flux through the interior of said coil bobbin, an energizing means for energizing said electromagnetic coil and for switching the energizing direction to invert the direction of said magnetic flux, and a plurality of projection members formed of a magnetic material, said projection members being disposed within said coil bobbin at equal intervals around and in parallel with said valve member, one end of each of said projection members being adapted to create a magnetic pole which is inverted according to the direction of said magnetic flux generated by said electromagnetic coil, said one end of each of said projection members being opposed to each of said magnetic poles of said valve member;
   said one end of each of said projection members disposed around the magnetic pole surfaces of said valve member being formed so that a part of one said end portion in the circumferential direction of each said projection member is different from the other portion of said projection member in the spacing from the opposed magnetic pole surface of said valve member or in the spacing from the opposed side face of said projection member adjacent thereto; and
   (4) a plurality of fluid passages formed within said case and adapted to be brought into communication with each other through the fluid passage of said valve member upon rotation of said valve member at said predetermined angle.

2. A solenoid valve according to claim 1, wherein said energizing means energizes said electromagnetic coil pulsewise.

3. A solenoid valve according to claim 1 wherein the surfaces of said rod-like member opposed to the surfaces of the magnetic poles of said valve member are parallel to the surfaces of the magnetic poles of said valve member.

4. A solenoid valve according to claim 1, wherein a part of said side end portion of each said rod-like member is notched.

5. A solenoid valve according to claim 1, wherein said one end of said valve member with the magnetic poles formed thereon is circular in section.

6. A solenoid valve according to claim 1, wherein the magnetic poles of said valve member are formed at four points on the outer periphery of said one end of said valve member.

7. A solenoid valve according to claim 1, wherein said fluid passage formed at the other end of said valve member extends radially through said valve member.

8. A solenoid valve according to claim 7, wherein the number of said plural fluid passages formed in said case is two and these two fluid passages are formed in series with each other, and wherein the other end of said valve member intersects said fluid passages formed in said case so that the fluid passage formed in said the other end coincides with the fluid passages of said case, the fluid passages of said case being communicated with or intercepted from each other upon rotation of said valve member at said predetermined angle.

9. A solenoid valve according to claim 7, wherein said plural fluid passages formed in said case are arranged radially, and wherein the other end of said valve member intersects the junction of said radially arranged fluid passages so that the fluid passage formed in said other end coincides with said junction, two of said radially arranged fluid passages formed in said case being selectively communicated with each other upon rotation of said valve member at said predetermined angle.

10. A solenoid valve according to claim 1, wherein each of said fluid passages formed at the other end of said valve member has a diameter larger than that of each of said plurality of fluid passages formed within said case.

* * * * *